United States Patent
Smiley et al.

(10) Patent No.: US 7,654,602 B2
(45) Date of Patent: Feb. 2, 2010

(54) RECLINING SEAT FOR A MATERIAL HANDLING VEHICLE

(75) Inventors: Gregory W. Smiley, Greene, NY (US); Robert Lewis, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 558 days.

(21) Appl. No.: 11/459,277

(22) Filed: Jul. 21, 2006

(65) Prior Publication Data

US 2008/0018155 A1    Jan. 24, 2008

(51) Int. Cl.
*B60N 2/12* (2006.01)
*B60N 2/28* (2006.01)

(52) U.S. Cl. ............ 296/65.16; 296/65.01; 296/65.13; 297/14; 297/341

(58) Field of Classification Search ............. 296/65.01, 296/65.05, 65.08, 65.09, 65.13, 65.16; 297/14, 297/15, 354.12, 130, 301.5, 302.1, 340, 336, 297/341
See application file for complete search history.

(56) References Cited

U.S. PATENT DOCUMENTS

| | | | | |
|---|---|---|---|---|
| 2,725,921 A * | 12/1955 | Markin | ................. | 297/216.15 |
| 3,594,037 A * | 7/1971 | Sherman | ................. | 297/14 |
| 3,632,165 A * | 1/1972 | Miller | ................. | 297/254 |
| 3,827,747 A | 8/1974 | Cookes | | |
| 4,177,001 A * | 12/1979 | Blackwood | ................. | 414/628 |
| 4,257,647 A * | 3/1981 | Gianessi | ................. | 297/336 |
| 4,452,486 A * | 6/1984 | Zapf et al. | ................. | 297/343 |
| 4,520,986 A | 6/1985 | Liljequist et al. | | |
| 4,890,887 A | 1/1990 | Koutsky et al. | | |
| 5,029,928 A * | 7/1991 | Huber | ................. | 296/63 |
| 5,364,151 A | 11/1994 | Yurasits | | |
| 5,520,440 A | 5/1996 | Lee | | |
| 5,524,721 A | 6/1996 | Yamauchi | | |
| 5,533,305 A * | 7/1996 | Bielecki | ................. | 52/79.1 |
| 5,601,338 A | 2/1997 | Wahls | | |
| 6,113,187 A | 9/2000 | Sugiyama et al. | | |
| 6,189,964 B1 | 2/2001 | Henshaw et al. | | |
| 6,273,506 B1 | 8/2001 | Niergarth et al. | | |
| 6,394,548 B1 | 5/2002 | Battey et al. | | |
| 6,926,364 B2 * | 8/2005 | Cooley et al. | ................. | 297/378.12 |
| 7,229,118 B2 * | 6/2007 | Saberan et al. | ................. | 296/65.01 |
| 7,270,371 B2 * | 9/2007 | Adragna et al. | ................. | 297/14 |
| 2006/0082182 A1* | 4/2006 | Saberan et al. | ................. | 296/65.01 |
| 2007/0096497 A1* | 5/2007 | Adragna et al. | ................. | 296/65.16 |

FOREIGN PATENT DOCUMENTS

DE    4225286 A1    3/1994
EP    1205426 A    5/2002

* cited by examiner

*Primary Examiner*—Glenn Dayoan
*Assistant Examiner*—Gregory Blankenship
(74) *Attorney, Agent, or Firm*—Quarles & Brady LLP

(57) ABSTRACT

A reclining seat for use in a material handling vehicle includes a seat back that is pivotally coupled to a wall of the operator compartment and to a seat pad. The seat pad is moveable toward a center of the operator compartment to provide the capability to recline, and is typically maintained in the upright position by a spring.

16 Claims, 4 Drawing Sheets

RECLINING SEAT FOR A MATERIAL HANDLING VEHICLE

CROSS-REFERENCE TO RELATED APPLICATION

Not applicable.

STATEMENT REGARDING FEDERALLY SPONSORED RESEARCH OR DEVELOPMENT

Not applicable.

BACKGROUND

The present invention relates to material handling vehicles, and more particularly to a reclining seat for an operator compartment in a material handling vehicle.

The operation of a forklift or other material handling vehicle requires the manipulation of an array of controls, levers, wheels, and switches for driving the vehicle forward and backward, steering the vehicle, and raising and lowering the forks, among other things. Furthermore, while a load is being lifted or lowered, it is desirable for the operator to be able to see the load as it is moved. Therefore, ergonomics play an important role in the design of such a material handling vehicle.

To assure efficiency of use of the material handling vehicle, however, it is important that the controls and seating be arranged so that the operator can easily reach and activate the controls with a minimal amount of movement, and easily view the load as it is raised and lowered. An ergonomic arrangement is important to maintain the comfort of the operator. Maintaining operator comfort can, among other things, maximize use of the vehicle by reducing the need for rest period or breaks by the operator to rest his or her hands, feet, or back. Accordingly, by enhancing the comfort of the operator compartment, the operator can be more productive and the overall efficiency of the vehicle can be improved.

In certain applications, a seat may enhance the comfort of the operator compartment. Typically, however, the seat provided for an operator in a lift truck is stationary. These types of seats, while functional, are not designed to allow the operator to view the load easily, and can cause the operator to stress his or her back and neck. There remains a need therefore, for enhancement to the operator compartment and seat for use in a material handling vehicle such as a forklift or reach truck design which maximizes operator comfort while minimizing potentially harmful muscle movements and allows the operator efficient vision to facilitate travel and to view the load.

SUMMARY

In one aspect, the present invention provides an operator compartment for an industrial vehicle. The operator compartment includes an enclosure including an opening surrounded by a substantially vertically-extending wall and a substantially horizontally-extending platform for receiving a seat, and a seat for the operator. The seat includes a seat pad slidably received on the substantially horizontally-extending platform, and a seat back, pivotally coupled at a first end to the seat pad and pivotally coupled at a second end to the wall of the enclosure. The seat pad is adapted to be slid along the platform away from the wall, such that the seat back pivots away from the enclosure wall allowing the seat to be moved between an upright and a reclined position.

In another aspect of the invention, a spring can be provided in the seat pad to force the seat pad to the upright position. The first end of the seat back can also be pivotally mounted to the seat pad through a first hinge and the second end of the seat back can be pivotally mounted to the seat pad through a second hinge. A rail system comprising a first rail coupled to the platform and a second rail coupled to the seat pad can also be provided to allow the seat pad to be moved to a reclined position. The seat back can be coupled to a mounting structure including a first plate slidable relative to a second plate, wherein the seat pad is moveable relative to the seat back to adjust the distance between the seat back and the seat pad when in the reclined position.

In another aspect of the invention, an industrial vehicle is provided comprising a fork, an operator station from which the operator drives the lift truck, a steering mechanism mounted for access on the enclosure, and an operator control mounted for access on the enclosure for selecting a direction of travel. The operator station is at least partially surrounded by an enclosure including a substantially vertically extending wall. A substantially horizontally-extending platform extends into the enclosure from the substantially vertically-extending wall, and a seat is provided on the substantially horizontally-extending platform. The seat includes a seat pad slidably coupled to the horizontally-extending platform for horizontal movement toward and away from the seat back, and a seat back pivotally coupled to the seat pad at a first end and pivotally coupled to the vertically-extending wall at a second end, such that the seat is movable between a first upright position in which the seat back is substantially perpendicular to the seat pad and a reclined position in which the seat back is angled at an angle other than perpendicular to the seat back.

In yet another aspect, the present invention provides an operator compartment for an industrial vehicle including an enclosure and a seat. An opening in the enclosure is surrounded by a substantially vertically-extending wall and includes a substantially horizontally-extending platform that extends from the substantially vertically-extending wall and receives the seat. The seat includes a seat pad slidably received on the substantially horizontally-extending platform, a seat back, pivotally coupled at a first end to the seat pad and pivotally coupled at a second end to the wall of the enclosure, and a spring coupled between the seat pad and the substantially vertical wall of the enclosure. The seat pad is therefore adapted to be slid along the platform away from the wall, such that the seat back pivots away from the enclosure wall allowing the seat to be moved between an upright and a reclined position, and the spring normally forces the seat pad to the upright position.

These and other aspects of the invention will become apparent from the following description. In the description reference is made to the accompanying drawings which form a part thereof, and in which there is shown preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
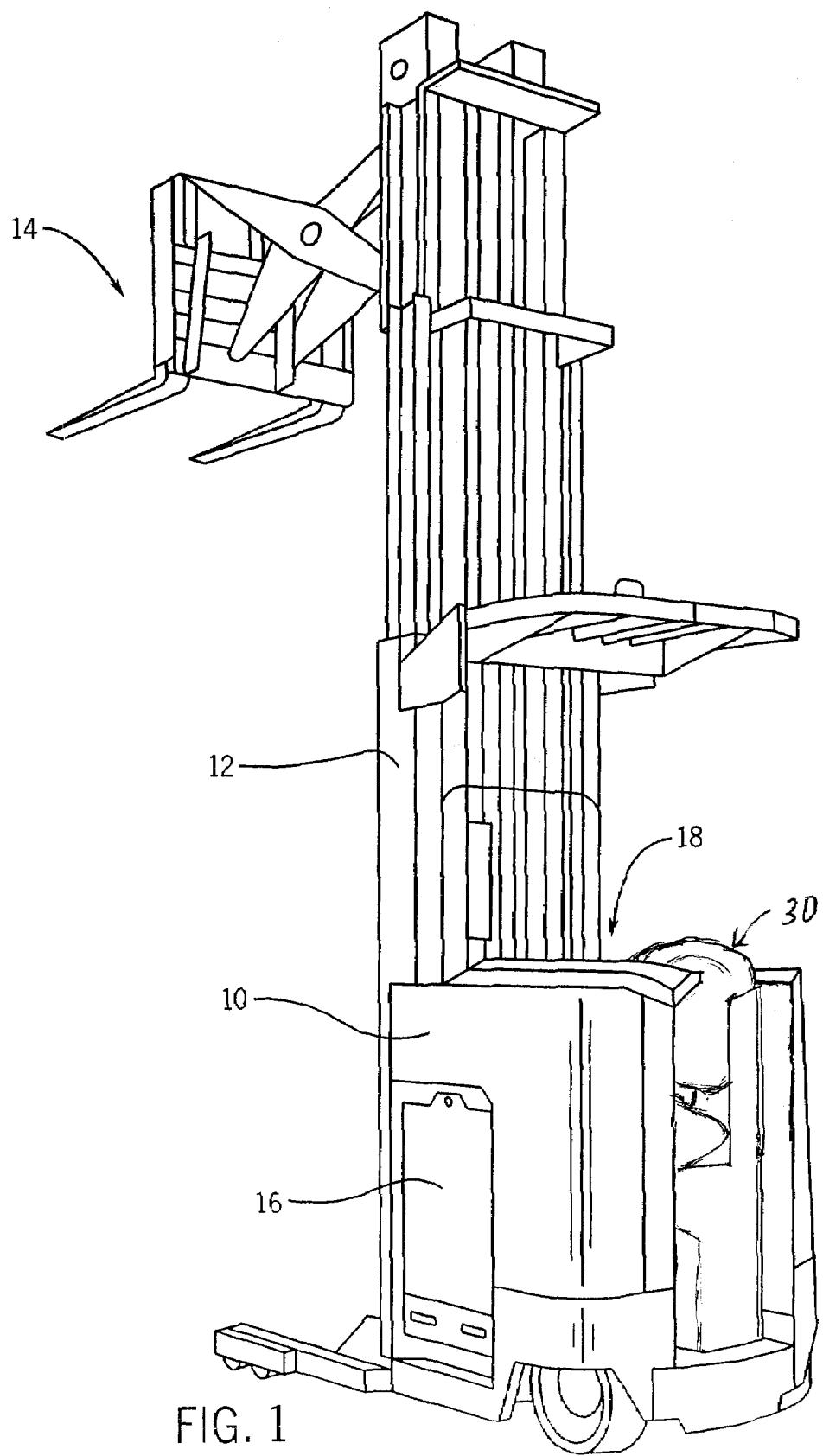
FIG. 1 is a perspective view of a lift truck constructed in accordance with the present invention.

Referring now to the Figures, and more particularly to FIG. 1, a lift truck includes a tractor 10 supporting a vertical mast 12. The tractor 10 includes a traction motor (not shown) which propels the truck, and a hoist motor (not shown) which lifts and lowers a set of forks 14 carried by the mast 12. These motors and other electrically-powered devices on the lift truck are powered by a lead-acid battery 16 housed in the tractor 10. As shown here, the lift truck is a rider reach truck, having a side configuration in which the operator is seated sideways while operating the vehicle.

Figure 2:
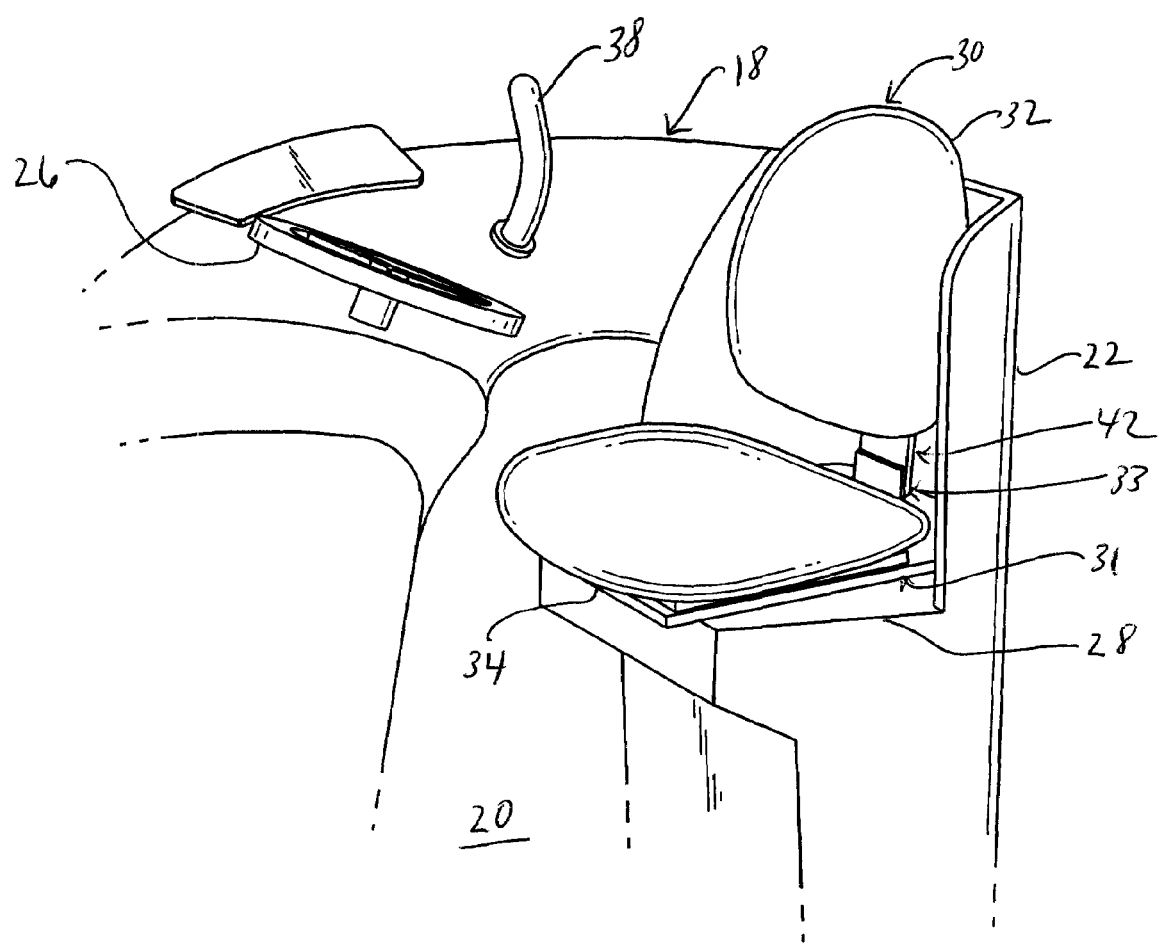
FIG. 2 is a perspective view of the operator compartment of the lift truck of FIG. 1.

Referring now to FIG. 2, the operator compartment 18 comprises an enclosure including a substantially vertically extending wall 22 in which an opening 20 is defined for entry and exit by the operator. A horizontally extending platform 28 extends towards a center of the operator compartment 18 from the wall 22, and the platform 28 and adjoining section of the wall 22 together form a mounting location sized and dimensioned to receive a seat 30. A frame 33, including a vertical mounting bracket 42 and a horizontal mounting plate 31 are arranged in the selected mounting location, and a vertically-extending seat back 32 and a horizontal seat pad 34 are coupled to a the mounting bracket 42 and mounting plate 31, respectively. The mounting bracket 42 is coupled to the vertically extending wall 22 and the seat mounting plate 31 is coupled to the horizontally extending platform 28. The mounting bracket 42 and seat mounting plate 31 are configured to allow the seat 30 to move between an upright (FIG. 3) and a reclined (FIG. 4) position, as described below. In the upright position, the seat back 32 is substantially perpendicular to the seat pad 34, while in the reclined position, the seat back 32 is pivoted away from the wall 22, and is angled with respect to the seat pad 34, as described below.

Figure 3:
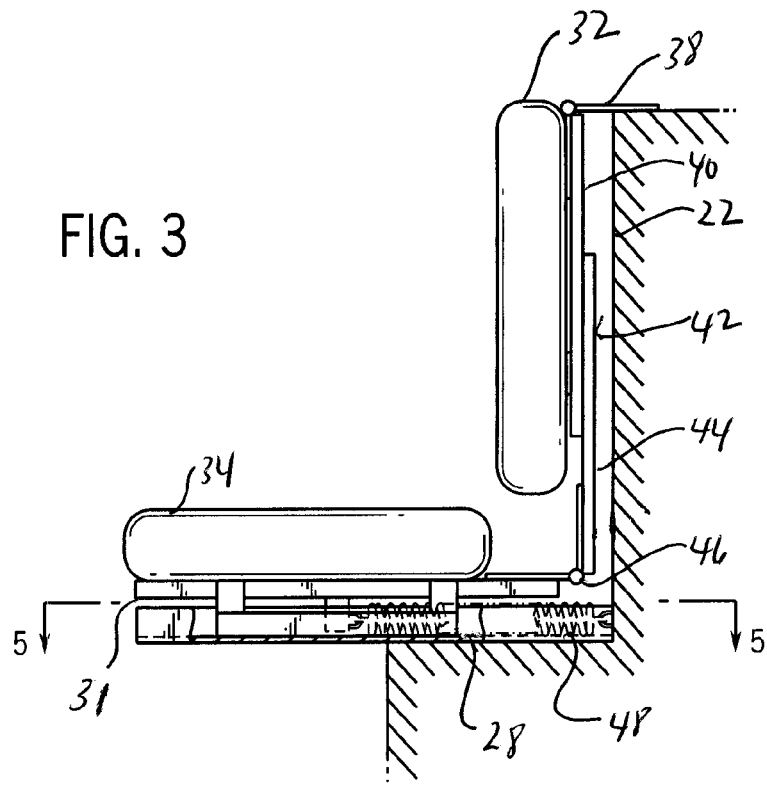
FIG. 3 is a side view of the seat of FIG. 2 in an upright position.

Referring now to FIG. 3, the mounting bracket 42 comprises a first plate 40 and a second plate 44 that is slidable relative to the first plate 40, allowing the mounting bracket 42 to extend and retract as the seat 30 is moved between an upright and a reclined position. The first plate 40 of the mounting bracket 42 is coupled to the vertically extending wall 22 through a hinge 38, and the seat mounting plate 31 is coupled to the mounting bracket 42 through a second hinge 46. The seat mounting plate 31 and associated seat pad 34 are coupled to the vertically extending wall 22 through a spring 48 which forces the seat 30 to the upright position unless the seat 30 is forcibly reclined by the operator. When the seat 30 is in the upright position, the seat pad 34 and seat back 32 are substantially perpendicular.

Figure 4:
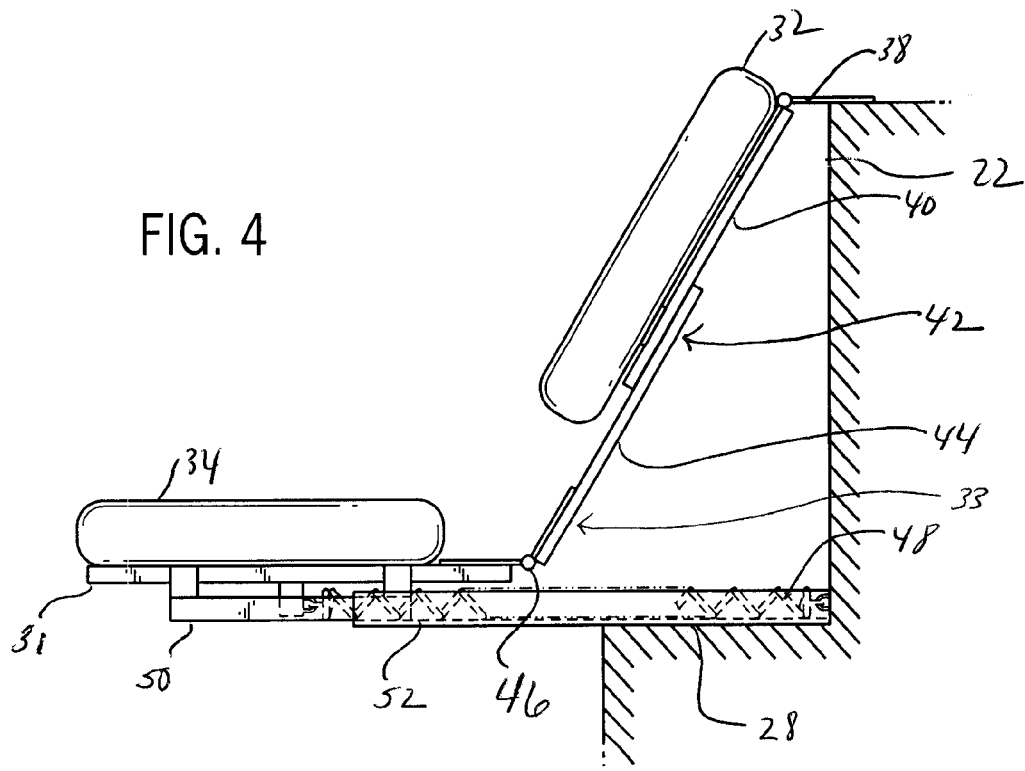
FIG. 4 is a side view of the seat of FIG. 2 in reclined position.

Referring now to FIG. 4 as the first plate 40 of the mounting bracket 42 is moveable relative to the second plate 44, and the seat back 32 is pivotable about hinge 38 and hinge 46 to an angle greater than 90° from the seat pad 34. As the first plate 40 moves with respect to the second plate 44, the mounting bracket 42 expands, increasing the distance between the seat back 32 and the seat pad 34. Although a number of possible mechanisms are available to movably couple the first and second plates 40 and 44, in one embodiment the first plate 40 includes a slot receiving a projection formed in the second plate 44.

Figure 5:
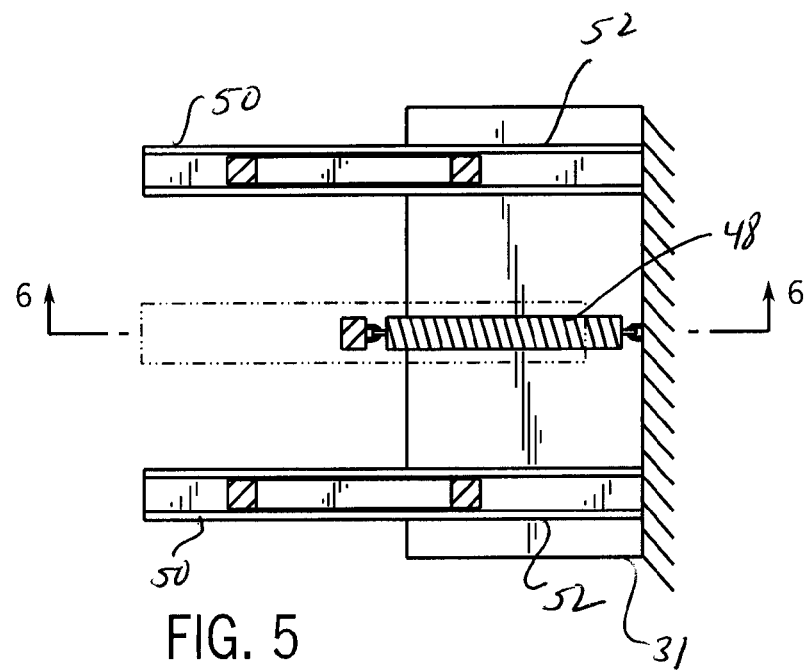
FIG. 5 is a cutaway view taken along the line 5-5 of FIG. 3.

Referring now also to FIG. 5, the seat pad 34 and associated mounting plate 31 are coupled to a first rail 50 received in and moveable with respect to a second rail 52 coupled to the platform 28, allowing the seat pad 34 to move along the substantially horizontally extending platform 28 toward the center of the operator compartment 18. As seen in FIG. 4, when the seat pad 34 is moved toward the reclining position, the return spring 48 expands providing a rearwardly-directed force on the seat pad 34.

Figure 6:
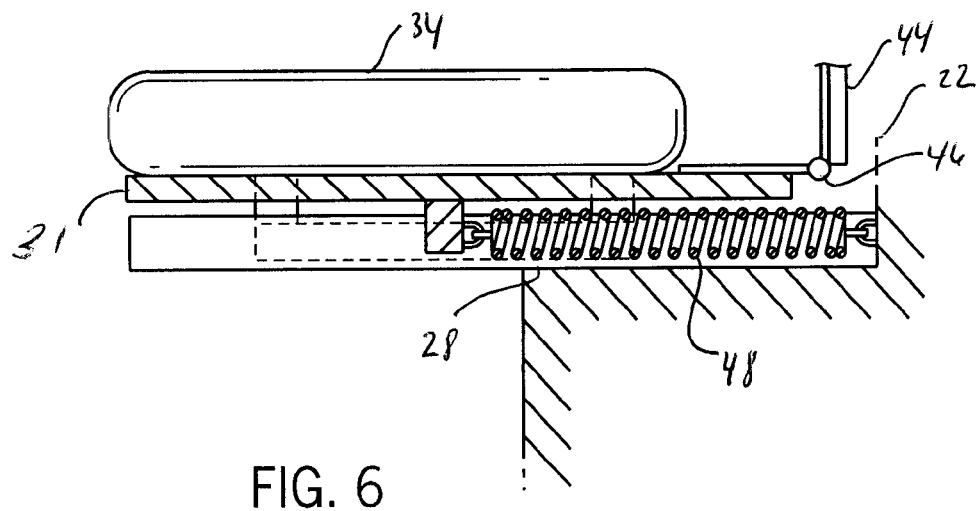
FIG. 6 is a cutaway view of the seat of FIG. 2 taken along the line 6-6 of FIG. 5.

Referring still to FIG. 5 and now also FIG. 6, the spring 48 is coupled at one end to the mounting plate 31 provided under the seat pad 34 and at the opposing end to the substantially vertically extending wall 22, and is, as described above, moveable between a first and a second position in which the seat is either reclined or upright, respectively, when a force is applied to overcome the force of the spring 48, the seat 34 is moved along the rails 50 and 52 and toward the vertical wall 22 to the upright position.

Referring again to FIGS. 3 and 4, in operation, the seat 30 is typically maintained in the upright position of FIG. 3 by the force of the spring 48. When desired, as, for example, to watch a load lifted up the mast 12 on forks 14 (FIG. 1), the operator can force the seat pad 34 forward toward the center of the operator compartment 18 by overcoming the force of the spring 48, and causing the rail 50 to move along rail 52 coupled to the seat mounting plate 31. As the seat pad 34 moves toward the center of the operator compartment, the mounting bracket 42 expands, and the seat back 32 and mounting bracket 42 pivot around hinges 36 and 38, such that the seat back 32 moves from a position substantially parallel to the wall 22 to a positioned angled with respect to the wall 22, and the back 32 moves to an angle other than ninety degrees with respect to the seat pad 34, such that the operator can sit in a reclined position. When the operator either stands up, or otherwise releases force on the seat, the seat pad 34 is forced by the spring 48 along the rail 52 back to the upright position, in which the seat pad is substantially perpendicular to the seat back as shown in FIG. 3.

Although preferred embodiments have been shown and described, it will be apparent to one of ordinary skill in the art that a number of modifications could be made to the method and apparatus described without departing from the scope of the invention. It should be understood, therefore, that the methods and apparatuses described above are only illustrative and do not limit the scope of the invention, and that various modifications could be made by those skilled in the art that would fall within the scope of the invention.

The invention claimed is:

1. An operator compartment for an industrial vehicle, comprising:
   an enclosure including an opening surrounded by a substantially vertically-extending wall and a substantially horizontally-extending platform for receiving a seat;
   a seat for the operator, the seat comprising:
      a seat pad slidably received on the substantially horizontally-extending platform;
      a seat back, pivotally coupled at a first end to the seat pad and pivotally coupled at a second end to the wall of the enclosure, said second end being vertically fixed relative to said wall preventing vertical movement of said second end upon horizontal movement of said seat pad;
   wherein, the seat pad is adapted to be slid along the platform away from the wall, such that the seat back pivots away from the enclosure wall allowing the seat to be moved between an upright and a reclined position.

2. The operator compartment as defined in claim 1, further comprising a spring in the seat pad, the spring forcing the seat pad to the upright position.

3. The operator compartment as defined in claim 1, wherein the first end of the seat back is pivotally mounted to the seat pad through a first hinge and the second end of the seat back is pivotally mounted to the wall of the enclosure through a second hinge.

4. The operator compartment as defined in claim 1, further comprising a first rail coupled to the platform for slidably receiving a second rail coupled to the seat pad.

5. The operator compartment as recited in claim 1, wherein the seat back is coupled to a mounting structure including a first plate slidable relative to a second plate, wherein the seat pad is moveable relative to the seat back to adjust the distance between the seat back and the seat pad when in the reclined position.

6. An industrial vehicle, comprising:
a fork;
an operator station from which the operator drives the industrial vehicle, the operator station being at least partially surrounded by an enclosure including a substantially vertically extending wall;
a steering mechanism mounted for access on the enclosure, the steering mechanism being controlled by the operator to select a direction of motion;
an operator control mounted for access on the enclosure for selecting a direction of travel;
a substantially horizontally-extending platform, extending into the enclosure from the substantially vertically-extending wall;
a seat provided on the substantially horizontally-extending platform, the seat comprising:
a seat pad slidably coupled to the horizontally-extending platform for horizontal movement toward and away from the seat back;
a seat back pivotally coupled to the seat pad at a first end and pivotally coupled to the vertically-extending wall at a second end, said second end being vertically fixed relative to said wall preventing vertical movement of said second end upon horizontal movement of said seat pad;
wherein, the seat is movable between a first upright position in which the seat back is substantially perpendicular to the seat pad and a reclined position in which the seat back is angled at an angle other than perpendicular to the seat back.

7. The industrial vehicle as recited in claim 6, further comprising a slidable rail structure coupled between the seat pad and the horizontally-extending platform.

8. The industrial vehicle as recited in claim 6, wherein the seat back is coupled to the wall of the enclosure through a hinge.

9. The industrial vehicle as recited in claim 6, further comprising a first hinge coupled between the seat back and the vertical wall and a second hinge coupled between the seat pad and the seat back.

10. The industrial vehicle as recited in claim 6, further comprising a spring coupled to the seat pad, the spring normally forcing the seat toward the upright position.

11. The industrial vehicle as recited in claim 6, wherein the seat back is coupled to a frame member comprising a first and a second plate, the first being moveable with respect to the second plate to extend a length of the seat back while the seat pad is moved forward to a reclined position.

12. An operator compartment for an industrial vehicle, comprising:
an enclosure including an opening surrounded by a substantially vertically-extending wall and a substantially horizontally-extending platform from the substantially vertically-extending wall for receiving a seat;
a seat for the operator, the seat comprising:
a seat pad slidably received on the substantially horizontally-extending platform;
a seat back, pivotally coupled at a first end to the seat pad and pivotally coupled at a second end to the wall of the enclosure, said second end being vertically fixed relative to said wall preventing vertical movement of said second end upon horizontal movement of said seat pad;
and a spring coupled between the seat pad and the substantially vertical wall of the enclosure;
wherein, the seat pad is adapted to be slid along the platform away from the wall, such that the seat back pivots away from the enclosure wall allowing the seat to be moved between an upright and a reclined position, and the spring normally forces the seat pad to the upright position.

13. The operator compartment as defined in claim 12, wherein the seat back is coupled to the vertically-extending wall of the enclosure through a hinge.

14. The operator compartment as defined in claim 12, wherein the seat back is coupled to a mounting plate comprising a first plate and a second plate, the first plate being movable relative to the second plate such that when the seat is moved to the reclined position a distance between the first and second plates is extended.

15. The operator compartment as defined in claim 14, wherein the seat back is coupled to the first plate and a hinge is coupled to the second plate.

16. The operator compartment as defined in claim 12, wherein a first rail is coupled to the horizontally-extending portion of the operator compartment and a second rail slidable within the first rail is coupled to the seat pad.

* * * * *

UNITED STATES PATENT AND TRADEMARK OFFICE
CERTIFICATE OF CORRECTION

PATENT NO. : 7,654,602 B2
APPLICATION NO. : 11/459277
DATED : February 2, 2010
INVENTOR(S) : Smiley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twenty-third Day of November, 2010

David J. Kappos
*Director of the United States Patent and Trademark Office*